United States Patent [19]

Araki

[11] Patent Number: 4,750,022

[45] Date of Patent: Jun. 7, 1988

[54] OPTICAL PROJECTION SYSTEM

[75] Inventor: Keisuke Araki, Tokyo, Japan

[73] Assignee: Canon Kabushiki Kaisha, Tokyo, Japan

[21] Appl. No.: 946,967

[22] Filed: Dec. 29, 1986

[30] Foreign Application Priority Data

| Dec. 27, 1985 | [JP] | Japan | 60-296321 |
| Dec. 27, 1985 | [JP] | Japan | 60-296322 |
| Dec. 27, 1985 | [JP] | Japan | 60-296323 |
| Dec. 27, 1985 | [JP] | Japan | 60-296324 |
| Dec. 27, 1985 | [JP] | Japan | 60-296325 |
| Dec. 27, 1985 | [JP] | Japan | 60-296326 |
| Dec. 27, 1985 | [JP] | Japan | 60-296327 |
| Dec. 27, 1985 | [JP] | Japan | 60-296328 |
| Dec. 27, 1985 | [JP] | Japan | 60-296329 |
| Dec. 27, 1985 | [JP] | Japan | 60-296330 |
| Dec. 27, 1985 | [JP] | Japan | 60-296331 |
| Dec. 27, 1985 | [JP] | Japan | 60-296332 |

[51] Int. Cl.[4] ............................................ G03B 27/44
[52] U.S. Cl. .................................... 355/46; 355/1; 355/51
[58] Field of Search ......................... 355/1, 46, 50, 51

[56] References Cited

U.S. PATENT DOCUMENTS 4,173,411 11/1979 Massengeil et al. ............ 355/51 X

Primary Examiner—Richard A. Wintercorn
Attorney, Agent, or Firm—Fitzpatrick, Cella, Harper & Scinto

[57] ABSTRACT

In an optical projection system in which the mismatching of multiple images and local variation in magnification on an image plane is compensated for, there are provided a compound eye system consisting of plural real image systems which project images of plural portions on an object plane onto the image plane, and deflecting members for deflecting luminous fluxes from the plural portions on the object plane.

22 Claims, 11 Drawing Sheets

OPTICAL PROJECTION SYSTEM

BACKGROUND OF THE INVENTION

1. Field of the Invention

The present invention relates to an optical projection system suitable for projecting an object plane, i.e., an original image, on an image plane in optical equipment such as electrophotographic copying machines and facsimile equipment. More particularly, the present invention concerns an optical projection system suitable for projecting an object plane on an image plane at various magnifications, including reduced and enlarged scales, using a so-called compound eye system in which a plurality of lens elements comprised of converging optical transmitters, microlenses, or the like are disposed in rows.

2. Related Background Art

Hitherto, in optical equipment such as electrophotographic copying machines and facsimile equipment, an object plane is projected on an image plane at a predetermined magnification by using a compound eye system.

The use of such a compound eye system has advantages in that, since the shooting field angle of a lens element may be narrow for projecting a given image plane, favorable optical performance can readily be obtained, and in that the overall optical length (i.e., the distance from the object plane to the image plane) can be made short, with the result that the overall apparatus can readily be made compact. As for methods of shooting by using this compound eye system, the following two methods are employed: one using an erect real image system for projecting an object plane on an image plane as an erect real image, and the other using an inverted real image system for projecting the same on an image plane as an inverted real image.

FIG. 1 is a schematic diagram of a compound eye system of the erect equal (one to one) magnification type, which has been proposed in, for instance, Japanese Patent Laid-Open Publication No. 83001/1980. In the drawing, reference numeral 20 denotes a compound eye system comprised of a plurality of erect real image systems 21 each constituted by a converging optical transmitter, microlenses, or the like. The given scope of an object plane 1 is projected on an image plane 2 as erect equal-magnification images by means of the individual erect real image systems 21, and an integrated image is formed by making the erect equal-magnification images overlap each other. As a result, a large object plane which cannot be covered by an independent erect real image system can be projected on the image plane. The compound eye system shown in FIG. 1 employs an equal shooting magnification, so that the compound eye system is arranged in such a manner that the optical axes of the respective erect real image systems 21 become parallel, and that respective beams of light on the optical axes perpendicularly intersect the object plane 1 and the image plane 2. This arrangement makes it possible to form an integrated image by overlapping the images projected on the image plane by means of the respective erect real image systems 21, i.e., the so-called multiple images.

However, in FIG. 1, if the object distance is varied to convert the optical projection system into a reduced or enlarged system, the multiple images formed by the erect real image systems do not consistently overlap on the image plane and are offset from each other due to the discrepancy between the predetermined magnification and the magnification of a portion between optical axes on the image plane, thereby resulting in a so-called "mismatching of images". This phenomenon of mismatching of images causes a substantial decline in the optical performance of a projected image.

To cope with this problem, a method of compensating for the mismatching of multiple images which occurs when reduced projection or enlarged projection is carried out using a compound eye system has been proposed in, for example, Japanese Patent Laid-Open Publication No. 16415/1982. In this publication, a plurality of erect real image systems 31 constituting a compound eye system 30 are arranged in such a manner that their optical axes are inclined gradually with respect to the optical axis 311 of the central erect real image system 310, thereby compensating for the mismatching of multiple images. With this compound eye system, however, the optical performance and the optical axis length (the optical length of the optical axis from the object plane to the image plane) vary depending on each erect real image system. In addition, with this compound eye system, the beams of light on the optical axes of the erect real image systems for projecting the periphery of the object plane deviate substantially from the perpendicular when such beams intersect the object plane and the image plane. For this reason, in the case of an erect real image system 41 which is inclined at a considerable angle, as shown in FIG. 3, the object plane whose projection magnification is equal, is inclined from the normal object plane 1 and becomes like the object plane 42.

Meanwhile, the image plane whose projection magnification is equal similarly, becomes inclined from the normal image plane 2 and becomes like an image plane 43. Consequently, there is a so-called "variation in magnification", in which the magnification of image formation differs partially within field of view by an amount corresponding to the difference in length between optical paths 141 and 142, as shown in FIG. 3.

Thus, with a conventional optical projection system employing a compound eye system, this variation in magnification occurs even if compensation is made for the mismatching of multiple images, so that it is difficult to obtain a projected image having high optical performance in effecting projection with magnifications other than the equal magnification.

Furthermore, in the same publication, an attempt is made to alleviate the variation in magnification. by off-centering an incident end surface or emergent end surface of each erect real image system or by adding a refracting power thereto. In this arrangement, however, the overall optical projection system becomes complex. In theory, the optical axis of each of the erect real image systems cannot be perpendicular to the object plane and the image plane. Therefore, there are limitations to such compensation, so that it is difficult to substantially overcome the variation in magnification by such a means.

In addition, other optical projection systems in which the mismatching of multiple images at the time when reduced projection or enlarged projection is effected is corrected using a compound eye system constituted by a plurality of erect real image systems have been proposed in, for example, Japanese Patent Laid-Open Publication Nos. 45420/1984 and 216115/1984.

As shown in FIG. 4, the Japanese Patent Laid-Open Publication No. 45420/1984 proposes an optical projection system in which the mismatching of multiple images is compensated for by an arrangement in which luminous flux deflecting members 52, 53 constituted by Fresnel lenses or the like having different deflection angles for respective erect real image systems are disposed on at least one of the object plane 1 side and image plane 2 side of a compound eye system 50 constituted by a plurality of erect real image systems 51.

Meanwhile, as shown in FIG. 5, the Japanese Patent Laid-Open Publication No. 216115/1984 proposes an optical projection system in which the mismatching of multiple images is compensated for by an arrangement in which a plurality of spherical lenses 62, 63 are disposed on at least one side of the object plane 1 side and image plane 2 side of a compound eye system 60 constituted by a plurality of erect real image systems 61.

However, in both of the optical projection systems proposed in the aforementioned two publications, the optical axis lengths of the respective erect real image systems differ, and the optical axes of the erect real image systems for projecting the periphery of the object plane are substantially inclined relative to the object plane and the image plane. Consequently, although it is possible to compensate for the mismatching of multiple images, as described above, the variation in magnification occurs, causing a substantial decline in the optical performance of a projected image.

In addition, in the other method of an optical projection system employing an inverted real image system, the "mismatching of images" and the "deviation in magnification" also occur due to similar causes. However, such an inverted real image system is capable of shortening the overall optical length since image formation can be effected once as compared with two-times image formation necessary for an erect real image system. Therefore, the inverted real image system has an advantageous feature in that the overall optical systems can be simplified, so that the overall apparatus can be made compact.

As such, the inverted real image system is employed in many types of electrophotographic copying machines. With the inverted real image system, however, the object image rotates 180° on the image plane, it is necessary to overlap on the image plane object images formed by the respective inverted real image systems, by using reflecting mirrors or the like to maintain a give relationship among the object images.

For instance, as shown in FIG. 6A, when projecting an object 23 placed on the object plane 1 on the image plane 2 using two inverted real image systems 221, 222, if a given scope of the object plane 1 is merely projected on the image plane by the inverted real image systems 221, 222, a so-called "image mismatching by rotation" of 180° occurs in which an image 24-1 formed by the inverted real image system 221 and an image 24-2 formed by the inverted real image system 222 are offset from each other, as shown in the drawing.

As a result, it becomes impossible to accurately project an object image. Therefore, as shown in FIG. 6B, an arrangement has hitherto been made so that respective object images 26-1, 26-2 of an object image 26 are projected accurately on the image plane 2 using a plurality of image rotating means 25 such as reflecting mirrors.

However, in order to arrange objects 23-1, 23-2 on the image plane 2 such as to form the object images 26-1, 26-2, it is necessary to dispose the plurality of reflecting mirrors in a complex manner, with the result that the overall apparatus has tended to become large in scale.

SUMMARY OF THE INVENTION

Accordingly, a primary object of the present invention is to provide an optical projection system which has improved optical performance of a projected image by compensating for the mismatching of multiple images and by reducing or eliminating the variation in magnification at the time when an object plane is projected at magnifications other than the equal magnification, including reduced or enlarged projection, using a compound eye system constituted by a plurality of erect real image systems or inverted real image systems.

Another object of the present invention is to provide an optical projection system having a simple arrangement in which, when the object plane is projected using a compound eye system constituted by a plurality of inverted real image systems, the 180° mismatching by rotation of the object image can readily be compensated for.

A still another object of the present invention is to provide an optical projection system in which the setting of optical systems can be effected readily, and which is capable of reducing the occurrence of various optical aberrations, particularly the chromatic aberration by using, e.g., a reflecting mirror.

In an optical projection system in accordance with the present invention, an arrangement is made such that, when the object plane is projected and overlapped on the image plane at a given magnification using a compound eye system having a plurality of erect real image systems or inverted real image systems, respective light beams on the optical axes of the plurality of erect real image systems become substantially perpendicular to at least one of the object plane and the image plane by means of a deflecting means having a plurality of optical members for deflecting a luminous flux.

In an optical projection system in accordance with the present invention, an arrangement is made such that, when the object plane is projected and overlapped on the image plane at a given magnification using a compound eye system having a plurality of inverted real image systems, the optical axes of the plurality of inverted real image systems intersect each other in a space by means of a deflecting means having a plurality of optical members for deflecting a luminous flux.

In accordance with an embodiment of an optical projection system of the present invention, an arrangement is made such that, when the object plane is projected and overlapped on the image plane at a given magnification using a compound eye system having a plurality of erect real image systems or inverted real image systems, the plurality of the erect real image systems or inverted real image systems are disposed substantially in the same plane, and respective light beams on the optical axes of the plurality of erect real image systems or inverted real image systems are substantially perpendicular to at least one of the object plane or the image plane.

In accordance with another embodiment of an optical projection system of the present invention, an arrangement is made such that, when the object plane is projected and overlapped on the image plane at a predetermined magnification using a compound eye system constituted by a plurality of real image systems, a plurality of rows of optical members in which a plurality of optical members for deflecting luminous fluxes are arranged in rows in given directions are provided at plural stages so that the points at which the optical axes of the respective real image systems intersect the object plane and the image plane are aligned along a straight line.

In accordance with still another embodiment of an optical projection system of the present invention, an arrangement is made such that, when the object plane is projected and overlapped on the image plane at a predetermined magnification using a compound eye system constituted by a plurality of real image systems, a plurality of rows of optical means in each of which a plurality of optical members for deflecting luminous fluxes are disposed in rows in given directions are provided, whereby a plurality of elongated areas on the object plane are formed as a plurality of elongated areas on the image plane.

In accordance with a further embodiment of an optical projection system of the present invention, when the object plane is projected and overlapped on the image plane at a predetermined magnification using a compound eye system constituted by a plurality of real image systems, respective light beams on the optical axes of the plurality of real image systems, among the light beams emergent from the object plane, are made mutually parallel light beams, the parallel light beams are subsequently made nonparallel light beams, the light beams are made to intersect each other in a space, and the nonparallel light beams are made parallel light beams having a pitch different from that of the above parallel light beams so as to be guided to the image surface, by means of a deflecting means having a plurality of optical members for deflecting luminous fluxes.

BRIEF DESCRIPTION OF THE DRAWINGS

FIGS. 27(A), 27(B), and 26(C) illustrate a further embodiment of the present invention.

DESCRIPTION OF THE PREFERRED EMBODIMENTS

Figure 7:
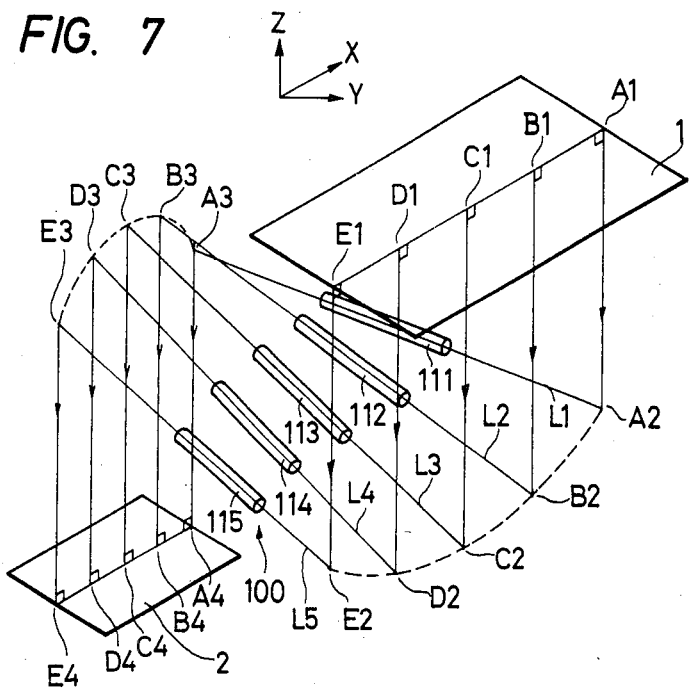
FIGS. 7, 8 and 9 illustrate one embodiment of the present invention.

FIG. 7 is a schematic diagram of one embodiment at the time when the optical projection system of the present invention is arranged by a reducing system. In the drawing, reference numeral 1 denotes an object plane; 2, an image plane; 100, a compound eye system constituted by a plurality of erect real image systems 111, 112, 113, . . .

Points A2, B2, C3, . . . and points A3, B3, C3, . . . respectively denote positions at which optical members for deflecting luminous fluxes passing through the respective erect real image systems are disposed in rows. Particularly in this embodiment, the optical members are constituted by reflecting members and are arranged with a predetermined inclination.

Incidentally, in this embodiment, the reflecting mirrors are omitted for the sake of simplicity, and only the optical paths of light beams on the optical axes of the respective erect real image systems are shown. It should be noted that this indication also applies to all the other embodiments that will be described below.

In this embodiment, a plurality of optical members disposed in rows along the points A2, B2, C2, . . . and A3, B3, C3, . . . respectively serve as a defecting means.

Points A1, B1, C1, . . . on the object plane 1 and points A4, B4, C4, . . . on the image plane 2 denote positions at which light beams L1, L2, L3, . . . on the optical axes of the erect real image systems 111, 112, 113, . . . intersect, respectively.

In this embodiment, the inclination of the reflecting mirrors disposed at the points A2 to E2 is set appropriately to ensure that the respective light beams L1 to L5 emerging from the object plane 1 and reaching the points A2-E2 become mutually parallel light beams.

These light beams L1 to L5, after being reflected by the reflecting mirrors disposed at the points A2 to E2, are made into mutually nonparallel light beams and are respectively guided to the corresponding erect real image systems 111–115. Subsequently, by appropriately setting the inclination of the reflecting mirrors provided at the points A3 to E3, the nonparallel light beams emerging from the erect real image systems 111 to 115 are guided onto the image plane 2 as parallel light beams having pitches different from those of the parallel light beams emerging from the object plane 1.

Thus, in this embodiment, the pitches of the parallel light beams are varied in accordance with projection magnification at the time when the light beams L1 to L5 respectively intersect the object plane 1 and the image plane 2 in a parallel state, so as to readily obtain a desired projection magnification. In this embodiment, a given scope of the object plane 1, e.g., a portion of the object plane in the vicinity of the point C1 is reflected by the reflecting mirror disposed at the point C3 by means of the erect real image system 113 via the reflecting mirror disposed at the position C2 with a predetermined inclination, and is then projected on a reduced scale on the vicinity of the point C4 on the image plane 2. At that juncture, in this embodiment, the points C1, C2, C3, and C4 are arranged so as to be located in the same plane. This arrangement ensures that the loci of the optical axes of the erect real image systems are located in the same plane, and that images projected by the erect real image systems do not rotate relatively, resulting in a "mismatching by rotation." The arrangements described above also applies completely to the other erect real image systems, and given scopes of the object plane 1 are projected on a reduced scale on the image plane, respectively.

It should be noted that, when the projection magnification is assumed to be m, the ratio of a pitch $\overline{A1, B1}$ between the points A1 and B1 on the object plane 1 to a pitch $\overline{A4, B4}$ between the points A4 and B4 on the image plane 2 becomes m-fold. The same also applies to the pitches of the other respective points.

In the coordinate system shown in FIG. 7, the coordinates of, for instance, the points B1, B2, B3, and B4 can be expressed as follows:

$B_1 = (x, \frac{1}{2}, h/2)$ $B_2 = (x, \frac{1}{2}, -h_1)$ $B_3 = (mx, -\frac{1}{2}, h_2)$ $B_4 = (mx, -\frac{1}{2}, -h/2)$ At this juncture, an arrangement is made such that, if L is assumed to be the optical axis length of an erect real image system, the coordinates of the points B2, B3 in the Z-axis direction become as follows:

$$h_1 + h_2 = \frac{(L-h)^2 - 1^2 - (1-m)^2 \cdot x^2}{2(L-h)} \quad (1)$$

where the optical axis length L is expressed as a function of the projection magnification 'm' and its value varies depending on the projection magnification 'm'.

In this embodiment, projected images on the image plane formed by the erect real image systems, i.e., the so-called multiple images, are made to overlap each other by varying the configurations and inclination of the plurality of reflecting mirrors disposed on the object plane 1 side and the image plane 2 side, thereby forming an integrated image as a whole so as to prevent the mismatching of images.

In addition, in this embodiment, the inclination of the respective erect real image systems and reflecting mirrors is set in such a manner that the light beams L1 to L5 on the optical axis of the respective erect real image systems intersect the object plane 1 and the image plane 2 substantially at right angles. In other words, the arrangement is such that after the light beams L1 to L5 on the optical axes of the respective erect real images, after being reflected by the reflecting mirrors, become mutually parallel and intersect the object plane 1 and the image plane 2 at right angles.

Figure 1:
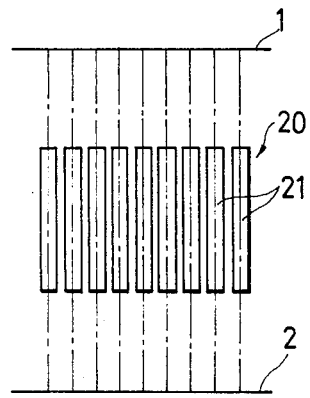
FIGS. 1, 2, 3, 4, 5, 6A, and 6B are diagrams illustrating examples of the prior art.
Figure 2:
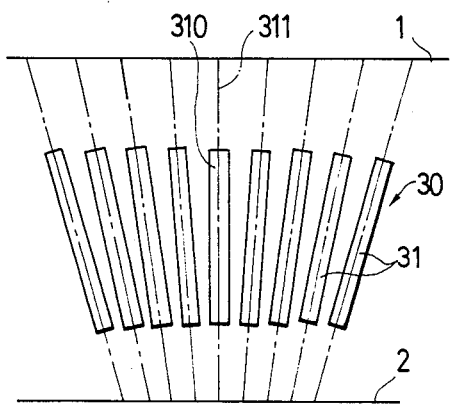
Figure 3:
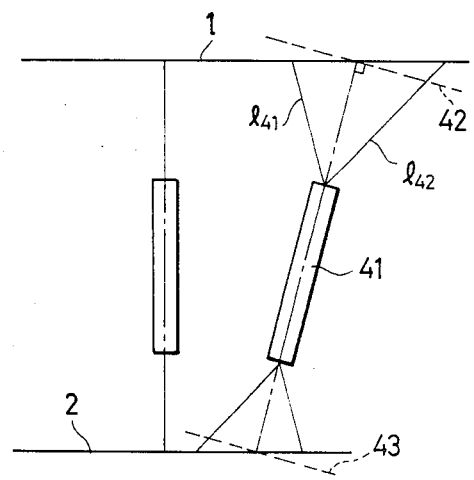
Figure 4:
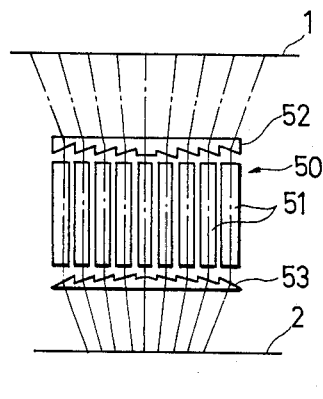
Figure 5:
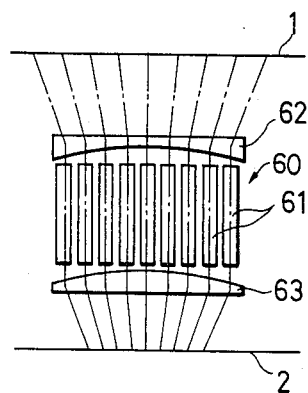
Figure 6A:
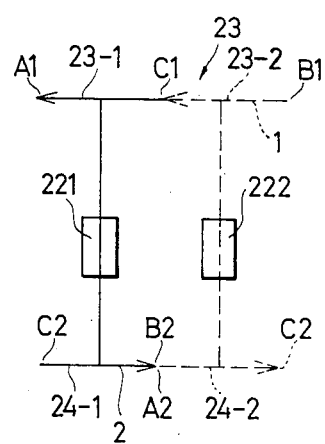
Figure 6B:
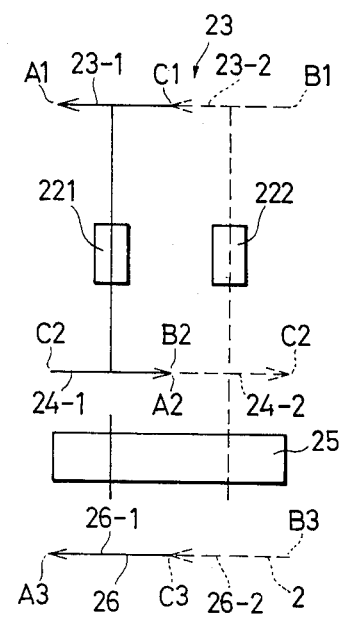

This arrangement prevents the occurrence of a "variation in magnification" occuring when the light beams on the optical axes of the erect real image systems described in relation to FIG. 3 intersect the object plane or the image plane in an inclined manner.

Figure 8:
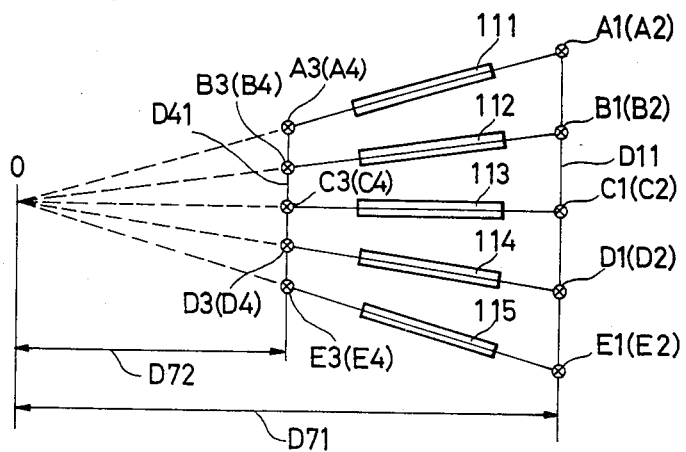
Figure 9:
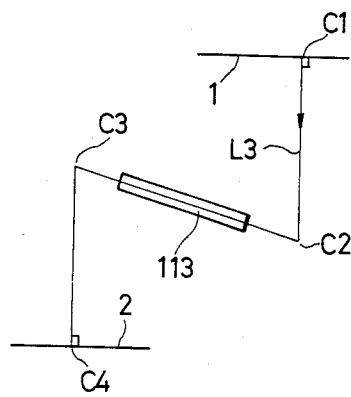

FIG. 8 is a top plan view of FIG. 7 at that juncture; while FIG. 9 is a side elevational view including the point C1 on the object plane 1 and the erect real image system 113 shown in FIG. 7.

The elements shown in FIGS. 8 and 9 that are identical with those shown in FIG. 7 are indicated by the same reference numerals.

In FIG. 8, a straight line D11 connecting the points A1, B1, C1, ... on the object plane 1 and a straight line D41 connecting the points A4, B4, C4, ... on the image plane 2 are parallel. The respective elements are arranged in such a manner that, if the optical axes of the plurality of the erect real image systems 111, 112, 113, ... are respectively extended, the extensions intersect a point O in a multi-level manner (i.e. viewed in a direction normal to the sheet of drawing) or simply intersect the same in a space.

Incidentally, using distances D71, D72 between the respective elements shown in FIG. 7, the projection magnification 'm' of optical projection system in this case is expressed as follows:

m = D72/D71

In this embodiment, the plurality of the erect real image systems are respectively constituted by identical lens elements. For this reason, the erect real image systems are respectively disposed three-dimensionally in different planes so that their optical axis lengths become identical. This arrangement allows all the erect real image systems to project the images under the same conditions, thereby ensuring uniform optical characteristics for the respective erect real image systems.

The positions A2, B2, C2, ... and positions A3, B3, C3, ... of the respective reflecting mirrors can be set desirably within the range that meets Formula (1), but, once the positions of one set of the reflecting mirrors are set, the positions of the other reflecting mirrors can be determined consecutively by virtue of the characteristics of the erect real image systems.

Figure 10:
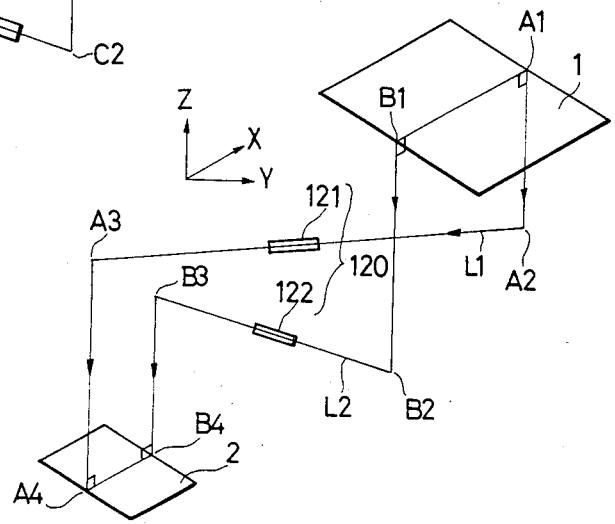
FIGS. 10, 11, 12, and 13 illustrate another embodiment of the present invention.

FIG. 10 is a schematic diagram of an optical projection system in accordance with another embodiment of the present invention. In the drawing, reference numeral 1 denotes the object plane; 2, the image plane; and 120, the compound eye system constituted by the plurality of inverted real image systems 121, 122.

The points A2, B2 and the points A3, B3 respectively denote positions at which optical members for deflecting luminous fluxes passing through the respective inverted real image systems are disposed in rows. Particularly in this embodiment, the optical members are constituted by reflecting members and are arranged at a predetermined inclination.

Incidentally, in this embodiment, the reflecting mirrors are omitted for the sake of simplicity, and only the optical paths of light beams on the optical axes of the respective inverted real image systems are shown.

In this embodiment, a plurality of optical members disposed in rows along the points A2, B2 and the points A3, B3 respectively serve as a deflecting means.

The points A1, B1 on the object plane 1 and the points A4, B4 on the image plane 2 denote positions at which the light beams L1, L2 on the optical axes of the inverted real image systems 121, 122 intersect, respectively.

In this embodiment, the inclination of the reflecting mirrors disposed at the points A2 to E2 is set appropriately to ensure that the respective light beams L1 to L5 emerging from the object plane 1 and reaching the points A2-E2 become mutually parallel light beams.

In this embodiment, a given scope of the object plane 1, e.g., a portion of the object plane 1 in the vicinity of the point B1 is reflected by the reflecting mirror disposed at the point B2, is passed through the inverted real image system 122 and is reflected by the reflecting mirror disposed at the position B3 with a predetermined inclination to be projected on the vicinity of the point B4 on the image plane 2. At that juncture, in this embodiment, the points B1, B2, B3, and B4 are arranged so as to be located in the same plane. This arrangement ensures that the loci of the optical axes of the inverted real image systems are located in the same plane, and that images projected by the inverted real image systems do not rotate relatively, resulting in no "mismatching by rotation." The arrangements described above also apply completely to the other inverted real image systems, and given scopes of the object plane 1 are projected on the image plane 2, respectively.

Figure 11:
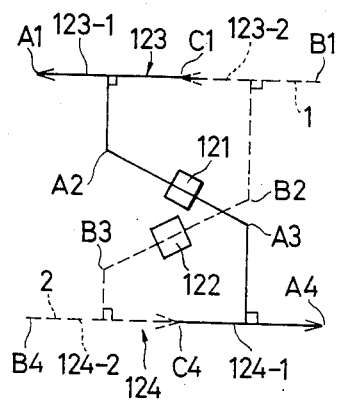

FIG. 11 is a schematic diagram illustrating relationships of image formation at that juncture. In the drawing, with respect to a part 123-1 of an object 123 on the object plane 1, an object image 124-1 is formed on the image plane by means of the inverted real image system 121 and a deflecting means constituted by reflecting mirrors disposed at the points A2, A3.

Similarly, with respect to another part 123-2 of the object 123, an object image 123-2 is formed on the image plane 2 by means of the converted real image system 122 and a deflecting means constituted by reflecting mirrors disposed at the points B2, B3.

Thus, in this embodiment, a 180° mismatching of rotation of parts 123-1, 123-2 of the object occurring when two inverted real image systems are used is compensated for, and a shot image similar to that obtained when one inverted real image system is used is thereby obtained.

It should be noted that, when the projection magnification is assumed to be 'm', the ratio of a pitch $\overline{A1, B1}$ between the points A1 and B1 on the object plane 1 to a pitch $\overline{A4, B4}$ between the points A4 and B4 on the image plane 2 becomes m-fold. The same also applies to the pitches of the other respective points.

In the coordinate system shown in FIG. 10, the coordinates of, for instance, the points B1, B2, B3, and B4 can be expressed as follows:

$B1 = (x, l, h/2)$ $B2 = (x, l, -h_1)$ $B3 = (-mx, -l, h_2)$ $B4 = (-mx, -l, -h/2)$

At this juncture, an arrangement is made such that, if L is assumed to be the optical axis length of an inverted real image system, the coordinates of the points B2, B3 in the Z-axis direction become as follows:

$$h_1 + h_2 = \frac{(L-h)^2 - l^2 - (1+m)^2 \cdot x^2}{2(L-h)} \quad (2)$$

where the optical axis length L is expressed as a function of the projection magnification 'm' and its value varies depending on the projection magnification 'm'.

In this embodiment, projected images on the image plane that are formed by the inverted real image systems, i.e., the so-called multiple images, are made to overlap each other by varying the configurations and inclination of the plurality of reflecting mirrors disposed on the object plane 1 side and the image plane 2 side in such a manner that the optical axes of the inverted real image systems intersect each other in a space, i.e., in such a manner that the optical axes intersect each other when projection of such optical axes is carried out on a plane. An integrated image as a whole is thereby formed so as to prevent the mismatching of images.

In addition, in this embodiment, the inclination of the respective inverted real image systems and reflecting mirrors is set in such a manner that the light beams L1 to L2 on the optical axis of the respective inverted real image systems intersect the object plane 1 and the image plane 2 substantially at right angles. In other words, the arrangement is such that after the light beams L1 to L2 on the optical axes of the respective inverted real images, after being reflected by the reflecting mirrors, become mutually parallel and intersect the object plane 1 and the image plane 2 at right angles. This arrangement prevents the occurrence of a "variation in magnification" described in relation to FIG. 3.

Figure 12:
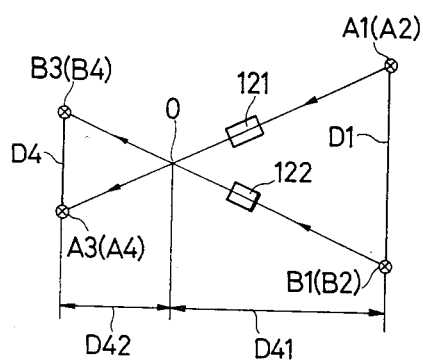
Figure 13:
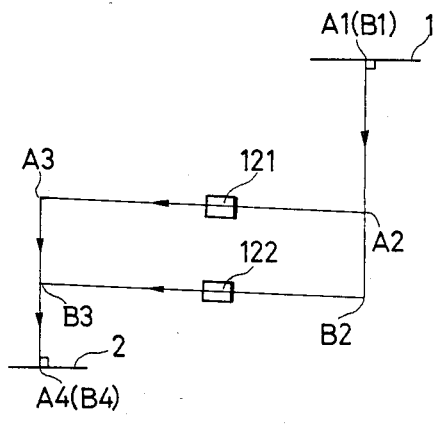

FIG. 12 is a top plan view of FIG. 10 at that juncture; while FIG. 13 is a side elevational view of FIG. 10.

The elements shown in FIGS. 12 and 13 that are identical with those shown in FIG. 10 are indicated by the same reference numerals.

In FIG. 12, a straight line D1 connecting the points A1, B1 on the object plane 1 and a straight line D4 connecting the points A4, B4 on the image plane 2 are parallel. The respective elements are arranged in such a manner that, if the optical axes of the plurality of the inverted real image systems 121, 122 are respectively extended, the extensions intersect a point O in a multilevel manner or simply intersect the same in a space.

Incidentally, using distances D41, D42 between the respective elements shown in FIG. 12, the projection magnification 'm' of optical projection system in this case is expressed as follows:

$m = D42/D41$

In this embodiment, the plurality of the inverted real image systems are respectively constituted by identical lens elements. For this reason, the inverted real image systems are respectively disposed three-dimensionally in different planes so that their optical axis lengths become identical. This arrangement allows all the inverted real image systems to project the images under the same conditions, thereby ensuring uniform optical characteristics for the respective inverted real image systems.

The positions A2, B2 and positions A3, B3 of the respective reflecting mirrors can be set desirably within the range that meets Formula (2), but, once the positions of one set of the reflecting mirrors are set, the positions of the other reflecting mirrors can be determined consecutively by virtue of the characteristics of the inverted real image systems.

Figure 14:
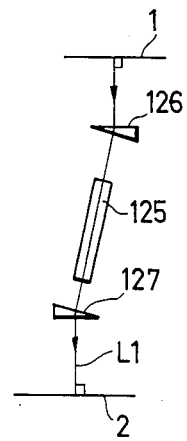
FIG. 14 illustrates a still another embodiment of the present invention.

In the above-described embodiment, a case in which reflecting mirrors are used as optical members is shown. However, the occurrence of the mismatching of images and the variation in magnification can similarly be prevented if an arrangement is made in which, as shown in FIG. 14, the light beam L1 on the optical axis of the erect real image system 121 or the inverted real image system 121 intersects the object plane 1 and the image plane 2 at right angles.

In the embodiments shown in FIGS. 7 and 10, description is made of a case where the variation in magnification is completely compensated for through an arrangement in which a light beam on the optical axis of the erect or inverted real image system intersects the object plane and the image plane at right angles. However, if a slight variation in magnification is allowed, an arrangement can be made such that a light beam on the optical axis intersects at least one of the object plane and the image plane at right angles or substantially at right angles. In addition, an arrangement may also be made such that the light beam intersects both planes at a slight inclination.

Figure 15:
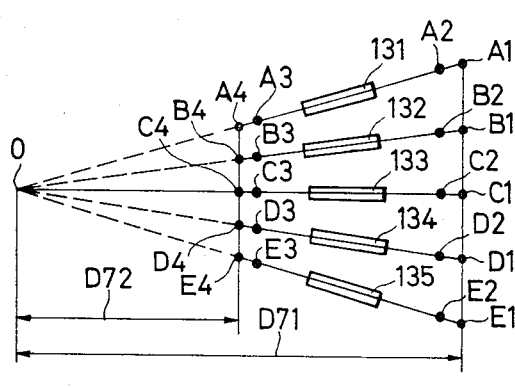
FIGS. 15 and 16 illustrate a further embodiment of the present invention.
Figure 16:
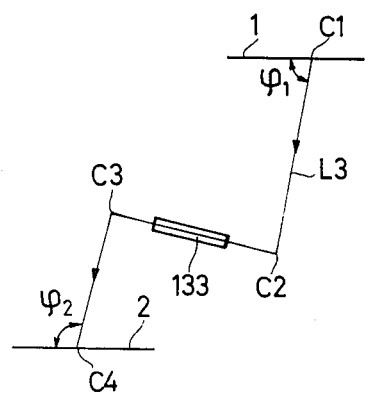

FIGS. 15 and 16 are top and side elevational views at that juncture similar to FIGS. 8 and 9, respectively. There are provided erect real image systems 131-135. FIG. 16 shows a case where the light beam L3 on the optical axis of the erect real image system 133 intersect the object plane 1 at an angle $\phi 1$ and the image plane 2 at an angle $\phi 2$ in a plane perpendicular to the arrangement direction of portions on the object or image plane.

Incidentally, in the embodiments shown in FIGS. 15 and 16, of the two deflecting means each constituted by plurality of reflecting mirrors, one deflecting means on the object plane 1 side or the image plane 2 side may be omitted.

Figure 17:
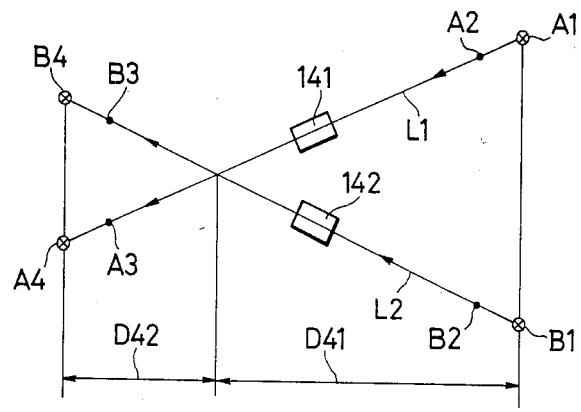
FIGS. 17 and 18 illustrate a further embodiment of the present invention.
Figure 18:
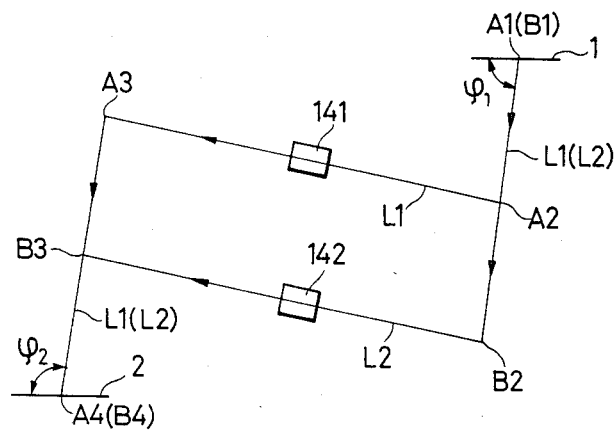

FIGS. 17 and 18 illustrate embodiments in which the optical axes or extensions thereof of inverted real image systems 141 and 142 in FIGS. 12 and 13 are angularly disposed with respect to the object plane and the image plane in the plane perpendicular to the above-mentioned arrangement direction. FIG. 18 shows a case where the light beam on the optical axis of the inverted real image system intersects the object plane 1 at the angle $\phi 1$ and the image plane 2 at the angle $\phi 2$.

Incidentally, in the embodiments shown in FIGS. 17 and 18, of the two deflecting means constituted by the plurality of reflecting mirrors, one deflecting means on the object plane 1 side or the image plane 2 side may be omitted.

Figure 19:
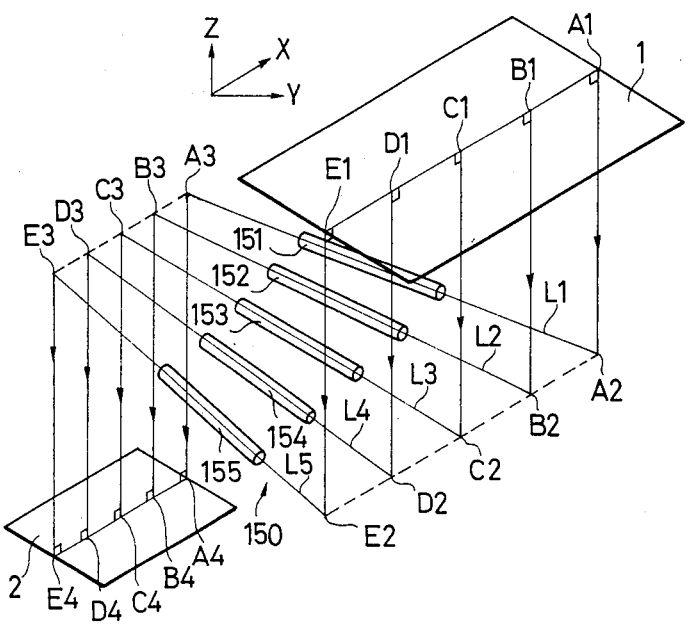
FIGS. 19, 20, 21, 22, 23, and 24 illustrate a further embodiment of the present invention.

FIG. 19 illustrates a further embodiment of an optical projection system in accordance with the present invention, in which erect real image systems 151-154 constituting a compound eye system 150 are disposed in a plane. In the drawing, the elements denoted by the same reference numerals as those described above indicate the same elements, so that description thereof will be omitted.

In this embodiment, a plurality of erect real image systems are respectively constituted by lens elements having different optical characteristics and all of these erect real image systems 151-154 are disposed in the same plane. This ensures the simplification of the arrangement. Each of the optical axis lengths of the erect real image systems 151-154 differs, and the optical axis length of the erect real image system 152 located in the center is the shortest, while the more peripheral is the position of the erect real image system, the longer is its optical axis length. The other arrangements in the embodiment shown in FIG. 19 are substantially identical with those shown in FIG. 7.

Figure 20:
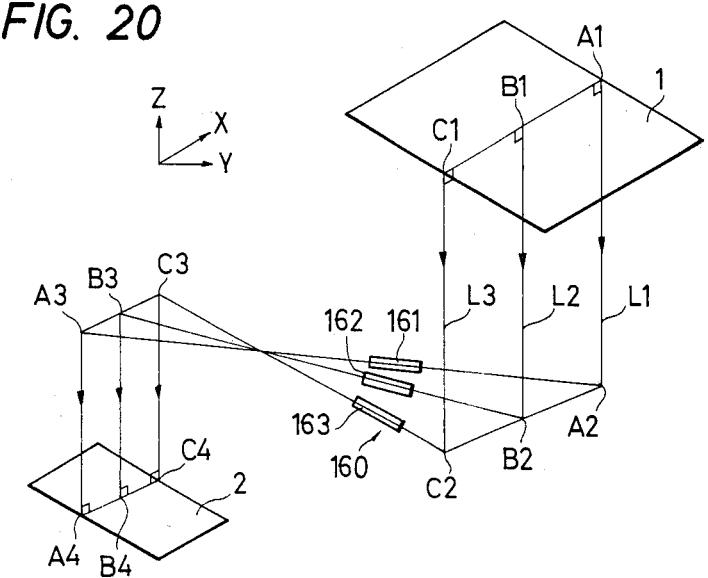

FIG. 20 illustrates a further embodiment in which inverted real image systems 161-163 constituting a compound eye system 160 are disposed in a plane. The elements denoted by the same reference numerals as those described above indicate the same elements.

In this embodiment, all the plurality of inverted real image systems are located in the same plane. This ensures the simplification of the arrangement. Each of the optical axis lengths of the plurality of the inverted real image systems differs, and the optical length of the inverted real image system 152 located in the center is the shortest, while the more peripheral is the position of the inverted real image system, the longer is its optical path.

In the embodiment shown in FIG. 20, although the number of the inverted real image systems 151-153 differs, the other arrangements are basically identical with those shown in FIG. 10.

Figure 21:
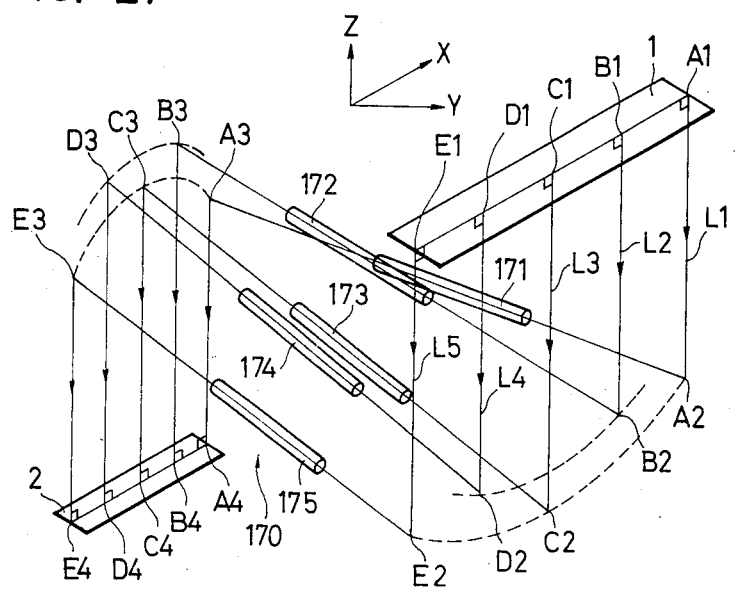
Figure 22:
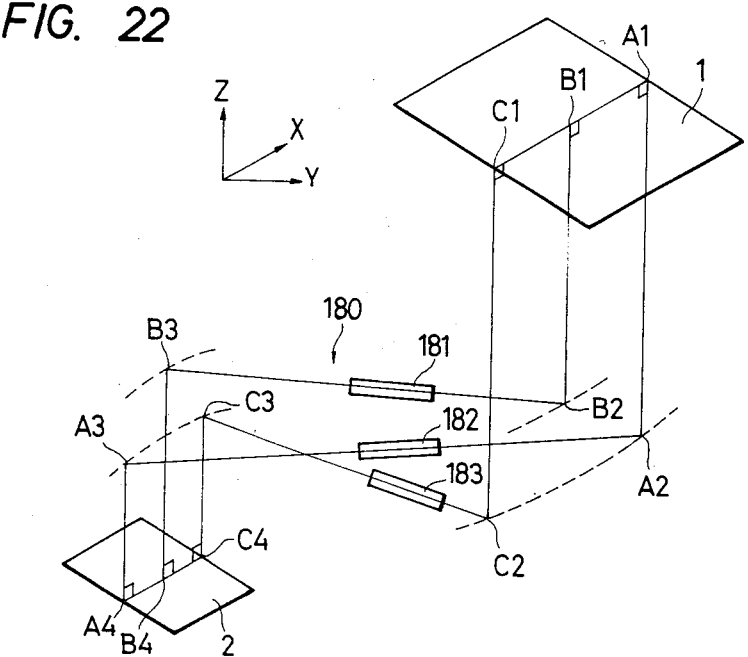

FIGS. 21 and 22 illustrate further embodiments in accordance with the present invention, in which FIG. 21 shows erect systems 171-175 constituting a co mpound eye system 170, while FIG. 22 inverted systems 181-183 constituting a compound eye system 180. In FIGS. 21 and 22, the elements denoted by the same reference numerals as those described above indicate the same elements.

In the embodiment shown in FIG. 21, row-like reflecting points B2, D2 selected alternately are disposed adjacent to the object plane 1 as compared with row-like reflecting points A2, C2, and E2, and the plurality of erect real image systems are correspondingly arranged alternately such as to form two vertically spaced apart rows relative to the object plane 1.

One row of optical members is constituted by two optical members disposed in a row at the points B2, D2, and the other row of optical members is similarly constituted by the three optical members disposed in a row at the points A2, C2, and E2. These two rows of optical members disposed at two stages constitute one deflecting means.

The state of arrangement the points A3, B3, C3, . . . on the image plane 2 side is similar to that of the points A2, B2, C2, . . . on the object side. A row of optical members disposed in a row at the points B3, D3 and a row of optical members disposed in a row at the points A3, C3, and E3 constitute another deflecting means.

In this embodiment, a given scope of the object plane 1, e.g., a portion of the object plane in the vicinity of the point C1 is reflected by the reflecting mirror disposed at the point C3 by means of the erect real image system 173 via the reflecting mirror disposed at the position C2 with a predetermined inclination, and is then projected on a reduced scale on the vicinity of the point C4 on the image plane 2.

At that juncture, in this embodiment, the points C1, C2, C3, and C4 are arranged so as to be located in the same plane. This arrangement ensures that the loci of the optical axes of the erect real image systems are located in the same plane, and that images projected by the erect real image systems do not rotate relatively, resulting in no "mismatching by rotation."

In this embodiment, projected images on the image plane formed by the erect real image systems, i.e., the so-called multiple images, are made to overlap each other by varying the configurations and inclination of the plurality of reflecting mirrors disposed on the object plane 1 side and the image plane 2 side, thereby forming an integrated image as a whole so as to prevent the mismatching of images.

In addition, in this embodiment, in order to prevent the above-described variation in magnification, the inclination of the respective erect real image systems and reflecting mirrors is set in such a manner that the light beams L1 to L5 on the optical axis of the respective erect real image systems intersect the object plane 1 and the image plane 2 substantially at right angles. In other words, the arrangement is such that after the light beams L1 to L5 on the optical axes of the respective erect real images, after being reflected by the reflecting mirrors, become mutually parallel and intersect the object plane 1 and the image plane 2 at right angles.

In the embodiment shown in FIG. 22, the row-like reflecting points A2, C2 selected alternately from the points on the object plane is disposed further away from the object plane 1 as compared with the row-like reflecting point B2 (although one such reflecting point is shown in this embodiment, there are actually a plurality of such reflecting points since three or more inverted real image systems exist). The plurality of inverted real image systems are correspondingly arranged alternately to form two vertically spaced apart rows in relation to the object plane 1.

One row optical members is constituted by the two optical members 182 and 183 disposed in a row at the points A2, C2, and the other row of optical members 181 is similarly constituted by optical members disposed in a row at the point B2. These two rows of optical members constitute one deflecting means. The state of arrangement of the points A3, B3, C3 on the image plane 2 side is similar to that of the points A2, B2, C2 on the object side. The row of optical members disposed in a row at the points A3 and the row of optical members disposed in a row at the point B3 constitute another deflecting means.

Incidentally, in the embodiment shown in FIG. 22, an arrangement for compensating for the aforementioned "mismatching by rotation" and "variation in magnification" is also adopted.

Figure 23:
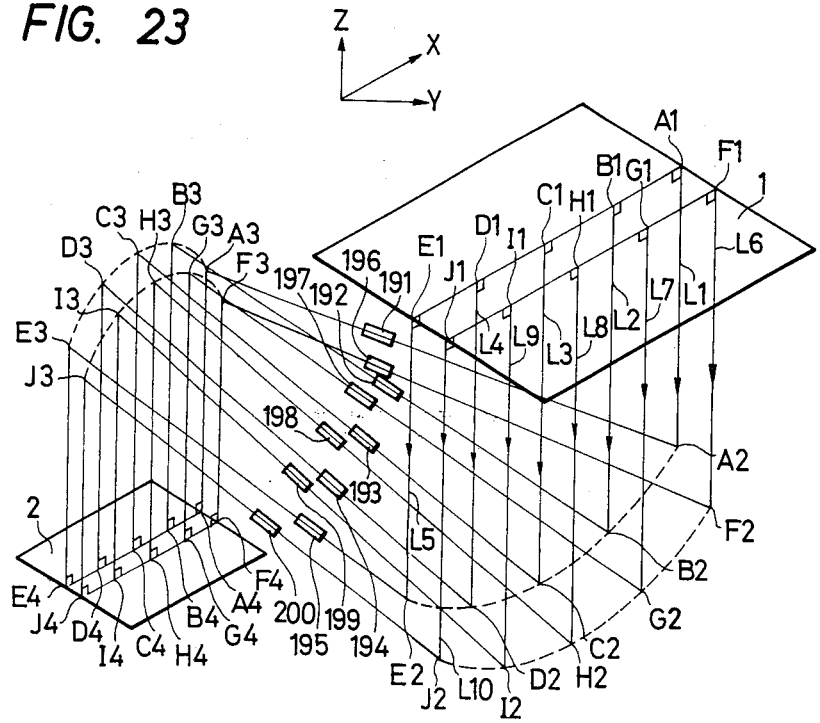
Figure 24:
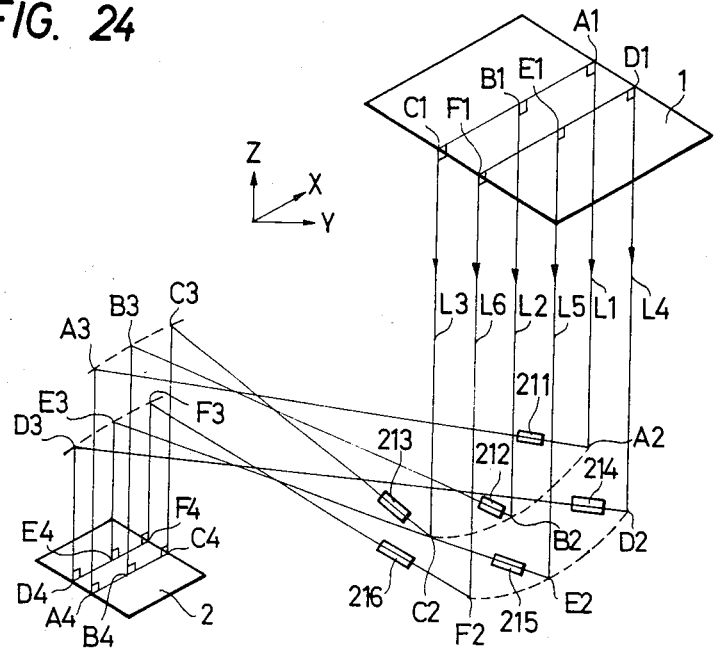

FIGS. 23 and 24 illustrate a further embodiment of an optical projection system in accordance with the present invention, in which FIG. 23 shows erect systems 191–200 constituting a compound eye system 190, while FIG. 24 shows inverted systems 211–216. In FIGS. 23 and 24, the elements denoted by the same reference numerals as those described above indicate identical elements.

In the embodiment shown in FIG. 23, optical members are respectively disposed at the points A2 to E2 with respect to the direction of the points A1 to E1 on the object plane 1, thereby constituting a row of optical members. Optical members are also respectively disposed at points F2–J2 with respect to the other direction of points F1 to J1 on the object plane 1, thereby constituting another row of optical members. The two rows of optical members are arranged in vertically spaced apart rows. In this embodiment, two rows of the optical members constitute one deflecting means.

On the image plane 2 side as well, as in the case of the object plane 1 side, a plurality of optical members disposed at the points A3 to E3 constitute one row of optical members, and a plurality of optical members disposed at the points D3 to F3 constitute another row of optical members. These two rows of optical members are arranged in vertically spaced apart rows in relation to the image plane 2. This constitutes the image plane-side deflecting means.

In addition, in this embodiment, an arrangement is such that, by providing a plurality of vertically spaced apart rows of optical members both on the object and image plane sides, a plurality of inverted real image systems for the respective optical members do not interfere with each other in a space.

In the embodiments shown in FIGS. 23 and 24, an arrangement which allows compensation of the aforementioned "mismatching by rotation" and "variation in magnification" is adopted.

In the foregoing embodiments, in order to prevent a cross talk between adjacent real image systems, it is preferable to dispose shielding members from the first deflecting means in which the deflecting means (e.g., reflecting surfaces, prisms) are separate for each real image system (erect and inverted) to the final deflecting means in which the deflecting means are separate for each real image system, via the real image system.

In the aforementioned embodiments, description has been made of a case where the optical projection system is applied to a reducing system, but the present invention can quite similarly be applied to an enlarging system as well if a reverse arrangement of the overall reducing system is adopted.

It should be noted that, in the foregoing embodiments, the layout of arranging the overall optical projection system may be established as desires, by providing a common reflecting surface for simply deflecting a luminous flux at least either between the object plane and the deflecting means or between the image plane and the deflecting means.

Such an establishment is effective in bringing the relative relationship between the object plane and the image plane to a given positional relationship and in compensating for the obverse and reverse relationship of an image.

In addition, if slight mismatching of images or deviation of magnification are allowed in the foregoing embodiments, an arrangement may be such that luminous fluxes from a plurality of real image systems are deflected by a single reflecting mirror.

Furthermore, in the foregoing embodiments, the objects of the present invention can be attained if the compound eye system has two or more real image systems.

Figure 25A:
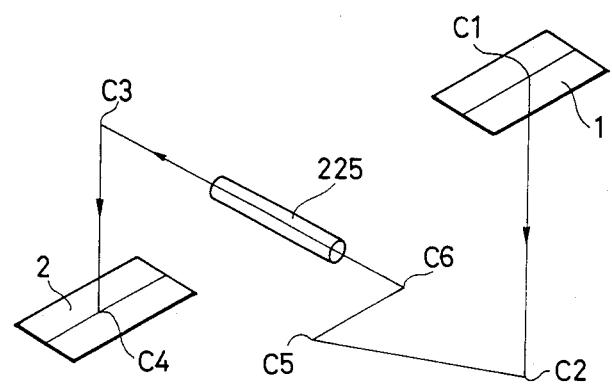
FIGS. 25(A) and 25(B) illustrate a further embodiment of the present invention.
Figure 25B:
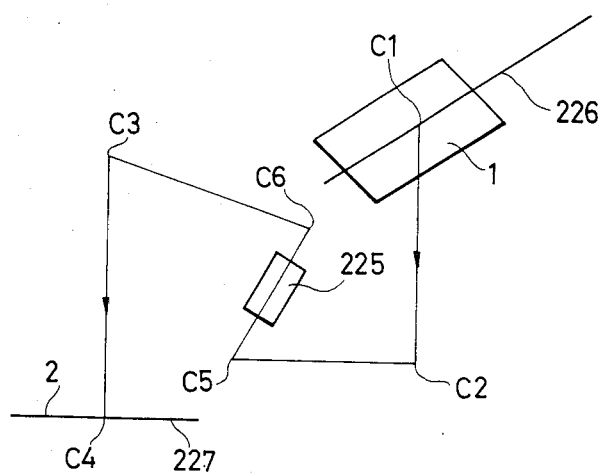

In the embodiments of the present invention, a case has been shown in which two deflecting means are used and one reflecting mirror or prism is employed as one deflecting means for each real image system. However, an arrangement may be made using a plurality of reflecting mirrors or deflecting members (prisms) for each real image system if an arrangement is made to compensate for the "mismatching by rotation", "mismatching of images", and "variation in magnification" and an equivalent arrangement is made independently for the respective portions of the object plane and image plane. For instance, as shown in FIG. 25(A), an arrangement may be made such that a light beam from the object plane 1 is guided from one plane to another plane and then returned to the original plane to be guided toward the real image system 225. Furthermore, it is possible to adopt a desired arrangement in accordance with a relative positional relationship between the object plane and the image plane, if the number of reflecting mirrors constituting a deflecting means is increased, as shown in FIG. 25(B), and if, at the time of projecting a line segment 226 in one direction of the object plane 1 on the image plane 2 by means of the respective real image systems 225, the image of the line segment 226 on the object plane is aligned with the other line segment 227 on the image plane 2, so that the so-called mismatching by rotation does not occur.

This arrangement is preferable since it increases the degree of freedom in the layout and therefore makes it possible to adopt a desired arrangement in accordance with a relative positional relationship between the object plane and the image plane.

Figure 26A:
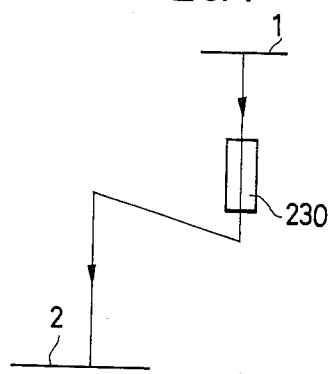
FIGS. 26(A) and 26(B) illustrate a further embodiment of the present invention.
Figure 26B:
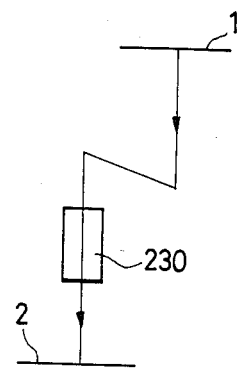

In addition, as shown in FIGS. 26(A) and 26(B), a compound eye system 230 constituted by a plurality of real image systems arranged perpendicularly to the sheet of drawing may be disposed either between the object plane and the deflecting means or between the image plane 2 and the deflecting means in accordance with the projection magnification and the distance between the object and the image.

This arrangement is desirable since it makes it possible to align the optical axes of the real image systems in parallel relationship and to adopt a simplified arrangement.

Figure 27A:
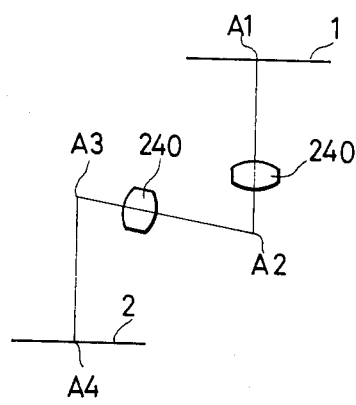
Figure 27B:
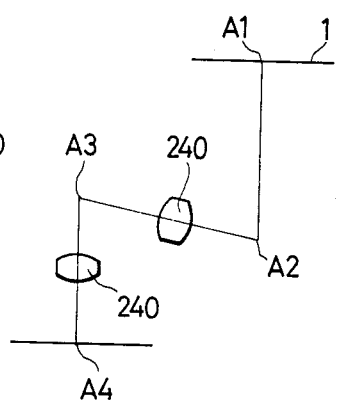
Figure 27C:
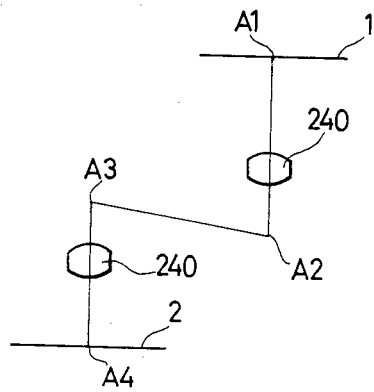

In this embodiment, in a case where the real image systems have a space in the optical system such as a set of microlenses, the deflecting means may be disposed at the position of the space, as shown in FIGS. 27(A), 27(B), and 27(C). Incidentally, in the drawings, reference numeral 240 denotes a microlens.

According to the present invention, when an object plane is projected on a reduced or enlarged scale using a compound system constituted by a plurality of erect real image systems or a plurality of inverted real image systems, it becomes possible, by using a deflecting means constituted by a or a plurality of optical members for deflecting a luminous flux, to attain an optical projection system which favorably compensates for both the mismatching of multiple images and variation in magnification on the image plane.

What is claimed is:

1. An optical projection system for carrying out non-equal magnification projection comprising:
   a compound eye system including a plurality of real image systems, said real image systems projecting images of plural portions on an object plane onto an image plane; and
   at least one deflecting means for deflecting a luminous flux from each of the plural portions on the object plane; and
   said real image systems and said deflecting means, at a time of non-equal magnification projection, being arranged in such a relationship that light beams on optical axes of said real image systems are substantially normal to a line extending in a direction of arrangement of at least one of the plural portions on the object plane and the plural portions on the image plane.

2. An optical projection system according to claim 1, wherein said deflecting means comprises a plurality of optical members, each arranged to correspond to one of said real image systems.

3. An optical projection system according to claim 2, wherein said optical member is a reflecting mirror.

4. An optical projection system according to claim 1, wherein said deflecting means is disposed at at least one space of spaces between said compound eye system and the object plane and between said compound eye system and the image plane.

5. An optical projection system according to claim 1, wherein said real image systems are disposed on generally the same plane.

6. An optical projection system according to claim 1, wherein each of said real image systems and points at which the light beam on the optical axis of said real image systems intersects the object plane and the image plane, lie in generally the same plane.

7. An optical projection system according to claim 1, wherein said deflecting means comprises plural rows of optical members in each of which rows a plurality of the optical members are arranged in one direction.

8. An optical projection system according to claim 7, wherein said optical members in said plural rows are so arranged that they deflect luminous fluxes from the plural portions on the object plane arranged in one direction, respectively.

9. An optical projection system according to claim 7, wherein said optical members in said plural rows are so arranged that the optical members in each of said rows deflect luminous fluxes from the plural portions on the object plane arranged in one corresponding direction, respectively.

10. An optical projection system according to claim 1, wherein the optical axes of said real image system are parallel to each other.

11. An optical projection system according to claim 1, wherein at least two deflecting means are provided, one of which converts parallel light beams on the optical axes of the real image systems to non-parallel light beams on the optical axes of the real image systems and the other of which converts non-parallel light beams to parallel light beams on the optical axes of the real image systems.

12. An optical projection system according to claim 1, wherein said real image systems and said deflecting means are so arranged that said deflecting means are so arranged that non-parallel light beams on the optical axes of said real image systems or extensions thereof intersect at one point as viewed from at least one direction.

13. An optical projection system according to claim 1, wherein at least two deflecting means are provided solely between said real image systems and one of the object plane and the image plane, and the optical axes of said real image systems are parallel to each other.

14. An optical projection system according to claim 1, wherein said real image system comprises a set of lenses and said deflecting means is provided between said lenses.

15. An optical projection system according to claim 2, wherein said optical member is a prism member.

16. An optical projection system according to claim 1, wherein said real image system is an erect real image system and extensions of non-parallel light beams on the optical axes of said erect real image systems intersect at one point as viewed from at least one direction.

17. An optical projection system according to claim 1, wherein said real image system is an inverted real image system and non-parallel light beams on the optical axes of said inverted real image systems intersect at one point in a multi-level manner as viewed from at least one direction.

18. An optical projection system according to claim 1, wherein optical axis lengths of said real image systems are identical.

19. An optical projection system according to claim 1, wherein the light beams on the optical axes of said real image systems are perpendicular to at least one of the object plane and the image plane.

20. An optical projection system according to to claim 1, wherein each of said real image systems and points at which the light beam on the optical axis of said real image system intersects the object plane, the image plane and said deflecting means, lie in different planes.

21. An optical projection system according to claim 1, wherein the light beams on the optical axes of said real image systems are parallel with each other at at least one space of spaces between said deflecting means and the object plane and between said deflecting means and the image plane.

22. An optical projection system according to claim 1, wherein said real image systems and said deflecting means is maintained to be arranged in said relationship even when the projection magnification has been changed.

* * * * *

UNITED STATES PATENT AND TRADEMARK OFFICE
CERTIFICATE OF CORRECTION

PATENT NO. : 4,750,022  
DATED : June 7, 1988  
INVENTOR(S) : Keisuke Araki

Page 1 of 3

It is certified that error appears in the above-identified patent and that said Letters Patent is hereby corrected as shown below:

COLUMN 2

Line 48, change "magnification." to --magnification--.

COLUMN 3

Line 46, change "give" to --given".

COLUMN 4

Line 22, change "A still" to --Still--.

COLUMN 5

Line 66, change "Points A2, B2, C3," --Points A2, B2, C2--

COLUMN 6

Line 13, change "defecting" to --deflecting--.

COLUMN 9

Line 5, change "converted" to --inverted--.

COLUMN 10

Line 65, change "intersect" to --intersects--.

UNITED STATES PATENT AND TRADEMARK OFFICE
CERTIFICATE OF CORRECTION

PATENT NO. : 4,750,022
DATED : June 7, 1988
INVENTOR(S) : Keisuke Araki

It is certified that error appears in the above-identified patent and that said Letters Patent is hereby corrected as shown below:

COLUMN 11

Line 3, change "plurality" to --the plurality--.

Line 51, change "152" to --162--.

Line 61, change "co" to --com- --.

Line 62, change "mpound" to --pound--; and change "FIG. 22 inverted" to --FIG. 22 shows inverted--.

COLUMN 12

Line 13, change "arrangement the" to --arrangement of the--

Line 15, change "object side." to --object 1 side.--.

Line 65, change "row optical" to --row of optical--.

COLUMN 13

Line 6, change "points A3" to --point A3--.

Line 67, change "desires," to --desired,--.

COLUMN 14

Line 40, change "systems" to --system--.

UNITED STATES PATENT AND TRADEMARK OFFICE
CERTIFICATE OF CORRECTION

PATENT NO. : 4,750,022
DATED : June 7, 1988
INVENTOR(S) : Keisuke Araki

It is certified that error appears in the above-identified patent and that said Letters Patent is hereby corrected as shown below:

COLUMN 15

Line 4, change "a" (first occurrence) to --one--.

COLUMN 16

Line 48, delete "to" (second occurrence).

Signed and Sealed this

Twenty-third Day of May, 1989

Attest:

DONALD J. QUIGG

*Attesting Officer*  *Commissioner of Patents and Trademarks*